(12) United States Patent
Miyakoshi et al.

(10) Patent No.: US 7,329,378 B2
(45) Date of Patent: Feb. 12, 2008

(54) MOLDING METHOD, COOLING APPARATUS AND OPTICAL ELEMENT

(75) Inventors: Hiroshi Miyakoshi, Hachioji (JP);
Kazumi Furuta, Akishima (JP);
Masahiro Morikawa, Hachioji (JP);
Osamu Masuda, Machida (JP);
Makiko Imae, Hino (JP)

(73) Assignee: Konica Minolta Holdings, Inc. (JP)

( * ) Notice: Subject to any disclaimer, the term of this patent is extended or adjusted under 35 U.S.C. 154(b) by 0 days.

(21) Appl. No.: 11/088,117

(22) Filed: Mar. 23, 2005

(65) Prior Publication Data
US 2005/0213209 A1    Sep. 29, 2005

(30) Foreign Application Priority Data
Mar. 29, 2004 (JP) ............................. 2004-095478
Jul. 12, 2004 (JP) ............................. 2004-204071
Feb. 21, 2005 (JP) ............................. 2005-043376

(51) Int. Cl.
*B29C 43/58* (2006.01)
*B29D 11/00* (2006.01)

(52) U.S. Cl. ................ 264/320; 264/2.7; 264/322; 264/338; 425/808

(58) Field of Classification Search ........... 264/1.1, 264/2.7, 1.32, 319, 320, 322, 338; 425/407, 425/808
See application file for complete search history.

(56) References Cited

U.S. PATENT DOCUMENTS

| 5,368,790 | A | * | 11/1994 | Greshes | 264/2.4 |
| 6,074,579 | A | * | 6/2000 | Greshes | 264/1.7 |
| 6,180,033 | B1 | * | 1/2001 | Greshes | 264/1.32 |
| 2005/0013004 | A1 | * | 1/2005 | Miyakoshi et al. | 359/619 |

FOREIGN PATENT DOCUMENTS

| JP | 2002-220241 | * | 8/2002 |
| JP | 2003-248118 | | 9/2003 |

OTHER PUBLICATIONS

English Abstract for Japanese Patent Application No. 2003-248118 dated Sep. 5, 2003.

* cited by examiner

*Primary Examiner*—Mathieu D. Vargot
(74) *Attorney, Agent, or Firm*—Cantor Colburn LLP

(57) ABSTRACT

There is described a molding method for molding a product, having a microscopic structure of high aspect ratio. The molding method includes the steps of: setting a temperature of a mold, having a microscopic shape, at a value higher than a glass transition temperature of a material being deformable with heat; pushing the mold against the material at a first velocity, after the material is positioned opposite to the mold so that the microscopic shape contacts the material; pushing the mold against the material at a second velocity being faster than the first velocity; and releasing the mold from the material. The pushing pressure for pushing the mold against the material at the first velocity is equal to or smaller than a half of that for pushing the mold against the material at the second velocity.

7 Claims, 15 Drawing Sheets

| | PRESS AT REFERNCE INCLINATION (a) | 0.15deg (b) | 0.3deg (c) |
|---|---|---|---|
| TP CENTER | | | |
| CENTER OF WAVE PATTERN | | | |
| CENTER OF RESIN - SHIFT AMOUNT OF CENTER OF WAVE PATTERN | 0.3mm (-145deg) | 0.5mm (-26deg) | 1.0mm (-30deg) |

MOLDING METHOD, COOLING APPARATUS AND OPTICAL ELEMENT

BACKGROUND OF THE INVENTION

The present invention relates to a method for molding an element having a microscopic structure, a cooling apparatus utilized for such the molding process and an optical element formed by employing such the method.

In recent years, various kinds of optical elements, such as a very high-accurate objective lens, etc., have been employed in the rapidly progressing field of the optical pick-up device. Since it is possible to speedily manufacture plural products having a uniform shape by molding such the optical elements out of a material, such as a plastic material, glass material, etc., it could be said that such the molding method is suitable for the mass production of such the optical elements.

Further, an optical pick-up device, developed in recent years, employs a laser beam emitted from a semiconductor laser diode whose wavelength is shorter than ever, and has a capability of recording and/or reproducing high-density information onto/from a recording medium, such as HD, DVD, BD, etc. As an optical element to be employed for an optical system in the abovementioned optical pick-up device, there has been well known a wave plate, which converts a polarization of the incident light to emit the polarization-converted light.

Generally speaking, the wave plate is made by sticking two artificial-quartz plates together in such a manner that optical axes of them are orthogonal relative to each other. Each of the two artificial-quartz plates has a birefringence property and is polished to a thickness established in advance corresponding to a specific wavelength. Accordingly, there has been a problem that a manufacturing cost per one element is relatively high. On the other hand, it has been well known that, even if a material itself would have no birefringence property, the material on which the microscopic shape having repetitions of microscopic protrusions in a half pitch of the wavelength of the penetrating laser beam is formed, would exhibits the similar birefringence property (set forth in Patent Document 1).

[Patent Document 1]

Tokkai 2003-248118 (Japanese Non-Examined Patent Publication)

It is necessary, however, that each of the abovementioned microscopic protrusions should be formed in a shape of high-aspect ratio in which its height is relatively great while the repetition pitch is small. Although it is theoretically possible to form such the microscopic protrusions as a fine pitch structure, a cost increase for forming such the microscopic structure would become a major problem when a certain amount of the products is led into a mass production. Specifically, Patent Document 1 teaches that the product can be acquired by conducting the steps of: creating a mold for the fine pitch structure; press-injecting a melted plastic material into the mold; and applying a pressure to form the product. However, since the melted plastic material exhibits an interfacial force, it is practically difficult to fill the melted plastic material into such a very narrow groove, a width of which would be lower than, for instance, 1600 nm. Accordingly, it has been virtually impossible to manufacture the products having such the fine pitch structure in the conventional molding mass-production process.

SUMMARY OF THE INVENTION

To overcome the abovementioned drawbacks in conventional molding methods, it is an object of the present invention to provide a molding method, a cooling apparatus and an optical element, each of which makes it possible to mold a product, having a microscopic structure of high aspect ratio, more easily than ever and without increasing its manufacturing cost.

Accordingly, to overcome the cited shortcomings, the abovementioned object of the present invention can be attained by molding methods, cooling apparatus, optical elements and molding apparatus described as follow.

(1) A molding method, comprising the steps of:

setting a temperature of a mold, having a microscopic shape, at a value higher than a glass transition temperature of a material being deformable with heat;

pushing the mold against the material at a first velocity, after the material is positioned opposite to the mold so that the microscopic shape contacts the material;

pushing the mold against the material at a second velocity being faster than the first velocity; and releasing the mold from the material.

To solve the aforementioned problems, as a result of the intensive studies, the present inventors have created a method for molding a product having a microscopic shape, from a viewpoint being completely different from the conventional viewpoints. Concretely speaking, the present inventors have found that, by pushing the heated mold, having a microscopic shape, against the material being deformable with heat, the microscopic shape is accurately profiled onto the melted surface of the material, and as a result, it becomes possible to obtain a molded product on which microscopic shape is accurately transferred even if its aspect ration is high. In this case, the melted plastic is not needed to be prepared and the manufacturing apparatus can be simplified. It becomes possible not only to reduce the cost for manufacturing installations, but also to manufacture a large amount of molding products in a short time interval.

However, when the present inventors tried to form a microscopic shape, having a very small arranging pitch and a high aspect ratio, by employing the abovementioned transferring method of the microscopic shape through further experiments, the present inventors found that it was impossible to obtain a desired microscopic shape due to an unexpected flow of the melted material generated when applying heat.

Accordingly, as a result of the further intensive studies performed by the present inventors to cope with the abovementioned problem, the present inventors have derived a technique effective for reducing a percent defective of the products when molding the microscopic shape especially having a high aspect ratio by employing such a material that is easy to flow when melted with heat. Concretely speaking, to solve the problem that the whole material is melted and flows out when the whole material is heated by the heated mold, initially, the mold is press-pushed against the material at a first velocity, after the material is positioned opposite to the mold so that the microscopic shape contacts the material. Accordingly, only the surface of the material is melted and falls into a transferable state of the microscopic shape. Then, the mold is press-pushed against the material at a second velocity being faster than the first velocity so as to accurately transfer the microscopic shape onto the surface of the material while suppressing excessive melting of the material with heat. Incidentally, the first velocity includes zero, namely a standstill state of the mold with respect to the material. Further, the term of the "microscopic shape" is defined as microscopic protrusions, a pitch of which is equal to or smaller than 1600 nm and an aspect ratio of each of which is equal to or greater than 1.25, or, preferably, equal to or greater than 3.

Further, it is preferable that the molding method includes the step of cooling the mold, after the step, of pushing the mold against the material at the second velocity, is completed, since the microscopic shape can be maintained due to the solidification of the material as a result of the cooling step.

Still further, it is preferable that the molding method includes the step of pushing again the mold, after the step, of pushing the mold against the material at the second velocity, is completed, since the microscopic shape can be accurately formed even if shrinkage of the material occurs.

Still further, it is preferable that a pushing pressure for pushing the mold against the material at the first velocity is equal to or smaller than a half of that for pushing the mold against the material at the second velocity, since the appropriate transferring operation of the microscopic shape can be conducted.

Still further, if at least a pressure application period, which is defined as a predetermined period for maintaining a moving velocity of the mold at zero, is established within a term from a time when the mold contacts the material to a time when the mold is released from the material, it becomes possible to effectively suppress the flow of the melted material melted with heat.

Still further, it is preferable that the larger an aspect ratio of the microscopic shape is, the slower the first velocity is, since it becomes easy to accurately transfer the microscopic shape having a high aspect ratio. Incidentally, the term of the "aspect ratio" is defined as a value represented by B/A, where A; width of the microscopic shape and B; height of the microscopic shape.

Yet further, it is preferable that a water-repellent finish is applied onto a surface of the mold, since it becomes possible to prevent the material from sticking onto the mold. Incidentally, the term of the "water-repellent finish" is defined as a surface treatment, which makes the contact angle of a drop of water equal to or greater than 60 degree, for instance, when the drop of water resides on the surface of the mold.

(2) A molding method, comprising the steps of:

setting a temperature of a mold, having microscopic shapes arrayed in a predetermined direction, at a value higher than a glass transition temperature of a material being deformable with heat;

pushing the mold against the material in a state of inclining the material for the mold so that the mold contacts the material from a part of the microscopic shapes in a direction intersecting the predetermined direction.

It is preferable that the molding method further includes the steps of:

changing an attitude of the mold to the material so as to reduce an inclination amount of the mold, after the mold contacts the material;

releasing the mold from the material in a state of inclining the material for the mold so that the mold separates from the material from a part of the microscopic shapes in a direction intersecting the predetermined direction.

As a result of the further intensive studies performed by the present inventors to cope with the abovementioned problem, the present inventors have derived a technique effective for reducing a percent defective of the products when molding the microscopic shape especially having a high aspect ratio by employing such a material that is easy to flow when melted with heat. Concretely speaking, to solve the problem that a flowing direction of the whole melted material is indefinite when the whole material is heated by the heated mold, the present inventors have found a method for inclining the mold when contacting it to the material. Further, the present inventors have also found that, by inclining the mold when releasing it from the material, distortions of the material are hardly generated, resulting in a more accurate transferring operation of the microscopic shape than ever.

Further, it is preferable that an inclination angle between the mold and the material is set at a value being larger than 0 degree and equal to or smaller than 0.5 degree, since the flow of the melted material can be controlled.

Still further, it is preferable that the molding method further includes the step of cooling the mold after completing the step of changing the attitude of the mold.

(3) A cooling device for cooling a mold having a microscopic shape and to be pushed onto a material being deformable with heat, comprising:

a coolant to absorb a heat of the mold; and a coolant path through which the coolant passes and which is disposed between a heat source and the mold.

When the microscopic shape is formed on the material by employing, for instance, the abovementioned manufacturing method, it is necessary to abruptly cool the heated mold just after the second press-pushing process is completed, so as to prevent the base shape from being deformed by the heat transmitted from the heated mold. To achieve this goal, the cooling device embodied in the present invention is provided with the coolant path through which the coolant passes and which is disposed between the heat source and the mold. When heating the mold, the coolant does not exist in the coolant path so as to improve the heating efficiency, while, when cooling the mold, the coolant passes through the coolant path so as to instantaneously cool the mold at a time and to absorb the residual heat of the heat source, resulting in a speedy solidification of the material.

(4) An optical element made of a plastic material, comprising:

a base; and microscopic protrusions arrayed on the base in a predetermined direction;

wherein a pitch of the microscopic protrusions is equal to or smaller than 1600 nm and an aspect ratio of each of the microscopic protrusions is equal to or greater than 1.25.

By employing the abovementioned manufacturing method, it becomes possible to conduct a mass-production of the optical elements having the microscopic protrusions, a pitch of which is equal to or smaller than 1600 nm and an aspect ratio of each of which is equal to or greater than 1.25 (or, preferably, equal to or greater than 3).

Further, it is preferable that a refractivity of the plastic material is in a range of 1.4-1.8 (or, more preferably, in a range of 1.4-1.7).

Still further, it is preferable that grooves, each of which corresponds to each of the microscopic protrusions, are formed on a plane adjacent to the microscopic protrusions.

Still further, it is preferable that the microscopic protrusions are a plurality of plate structures arrayed at predetermined pitches on the base, and a corner end portion of each of the plurality of plate structures is chamfered in a shape of arc or a straight line when viewing in an arrayed direction of the plurality of plate structures, since it becomes possible to improve not only the stiffness of the plate structures, but also the flow of the melted material when forming the plate structures.

Still further, it is preferable that a length of the corner end portion to be chamfered is equal to or greater than 95% of a height of the plate structures.

Still further, it is preferable that the optical element is a wave plate.

Still further, it is preferable that the pitch of the microscopic protrusions is in a range of 300-400 nm, and a width of the microscopic protrusions is in a range of 0.6×P-0.9×P nm (or, more preferably, in a range of 0.6×P-0.7×P nm), where P represents a value of the pitch, and a height of the microscopic protrusions is in a range of 500-3000 nm.

Still further, it is preferable that, when a light beam having a wavelength of 400 nm or 650 nm is incident into the optical element, a light beam having a phase difference of $(0.25\pm0.05)\lambda$ is emitted from the optical element, where $\lambda$ represents a value of the wavelength.

Yet further, it is preferable that, when a light beam having a wavelength of 780 nm is incident into the optical element, a light beam having a phase difference of $(0.25\pm0.05)\lambda$ is emitted from the optical element, where $\lambda$ represents a value of the wavelength.

(5) A molding apparatus, comprising:
 a mold having a microscopic shape;
 a heater to heat the mold; and
 a driving section to drive the mold;
 wherein, when the heater heats the mold up to a temperature higher than a glass transition temperature of a material being deformable with heat, the driving section pushes the mold against the material at a first velocity, after the material is positioned opposite to the mold so that the microscopic shape contacts the material, and then, further pushes the mold against the material at a second velocity being faster than the first velocity.

To solve the problem that the whole material is melted and flows out when the whole material is heated by the heated mold, initially, the driving section press-pushes the mold against the material at a first velocity, after the material is positioned opposite to the mold so that the microscopic shape contacts the material. Accordingly, only the surface of the material is melted and falls into a transferable state of the microscopic shape. Then, the driving section press-pushes the mold against the material at a second velocity being faster than the first velocity so as to accurately transfer the microscopic shape onto the surface of the material while suppressing excessive melting of the material with heat.

Further, it is preferable that the molding apparatus further includes a cooling device to cool the mold after the driving section pushes the mold against the material at the second velocity. The cooling device, described in item (3), can be preferably employed as the abovementioned cooling device.

Still further, it is preferable that the driving section pushes again the mold against the material after pushing the mold against the material at the second velocity.

Still further, it is preferable that a pushing pressure for pushing the mold against the material at the first velocity is equal to or smaller than a half of that for pushing the mold against the material at the second velocity.

Still further, it is preferable that a moving velocity of the mold is set at zero during a predetermined time period within a term from a time when the mold contacts the material to a time when the mold is released from the material.

Still further, it is preferable that the larger an aspect ratio of the microscopic shape is, the slower the first velocity is.

Still further, it is preferable that a water-repellent finish is applied onto a surface of the mold.

According to the present invention, it becomes possible to provide a molding method, a molding apparatus, a cooling apparatus for the same and an optical element, each of which makes it possible to mold a product, having a microscopic structure of high aspect ratio, more easily than ever and without increasing its manufacturing cost.

BRIEF DESCRIPTION OF THE DRAWINGS

Other objects and advantages of the present invention will become apparent upon reading the following detailed description and upon reference to the drawings in which:

FIG. 6(a) shows a microphotograph of molding material P molded through molding processes embodied in the present invention, while

DETAILED DESCRIPTION OF THE PREFERRED EMBODIMENT

Figure 1:
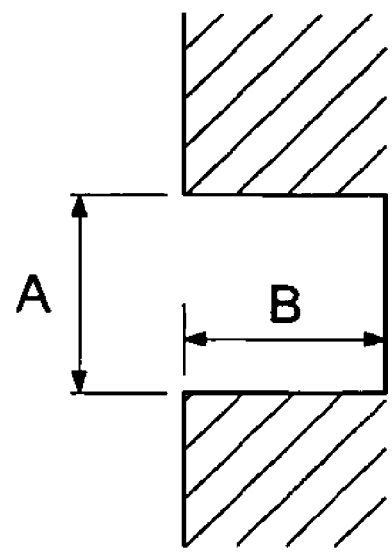
FIG. 1(a) and FIG. 1(b) show schematic diagrams for explaining an aspect ratio.
Figure 1:
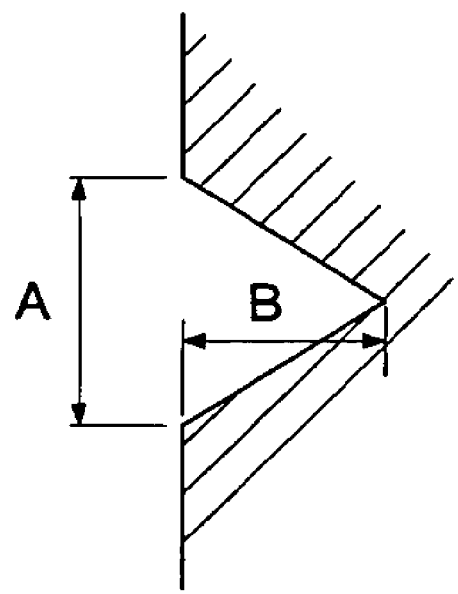
Figure 2:
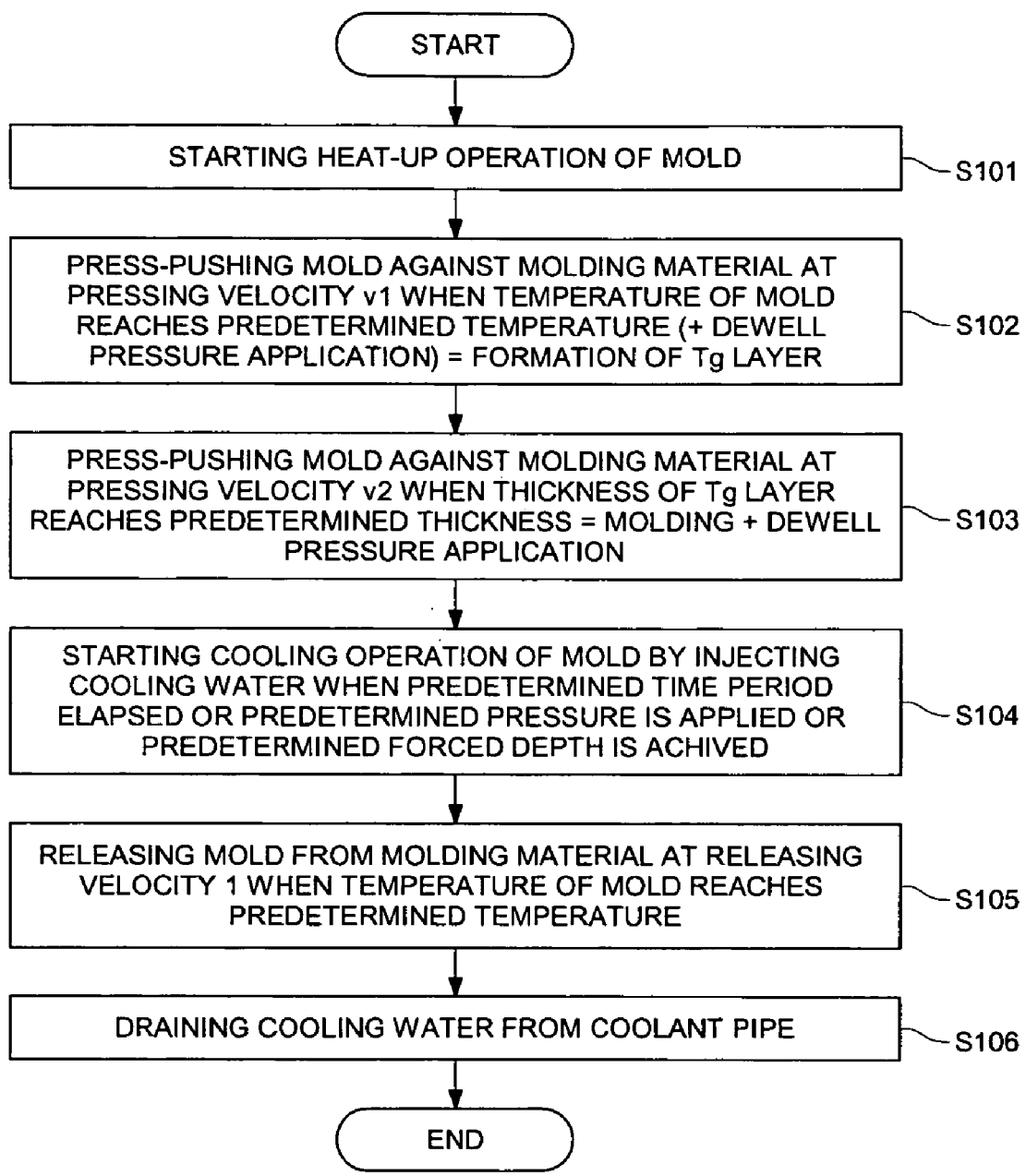
FIG. 2 shows a flowchart of an exemplified molding method embodied in the present invention.
Figure 3:
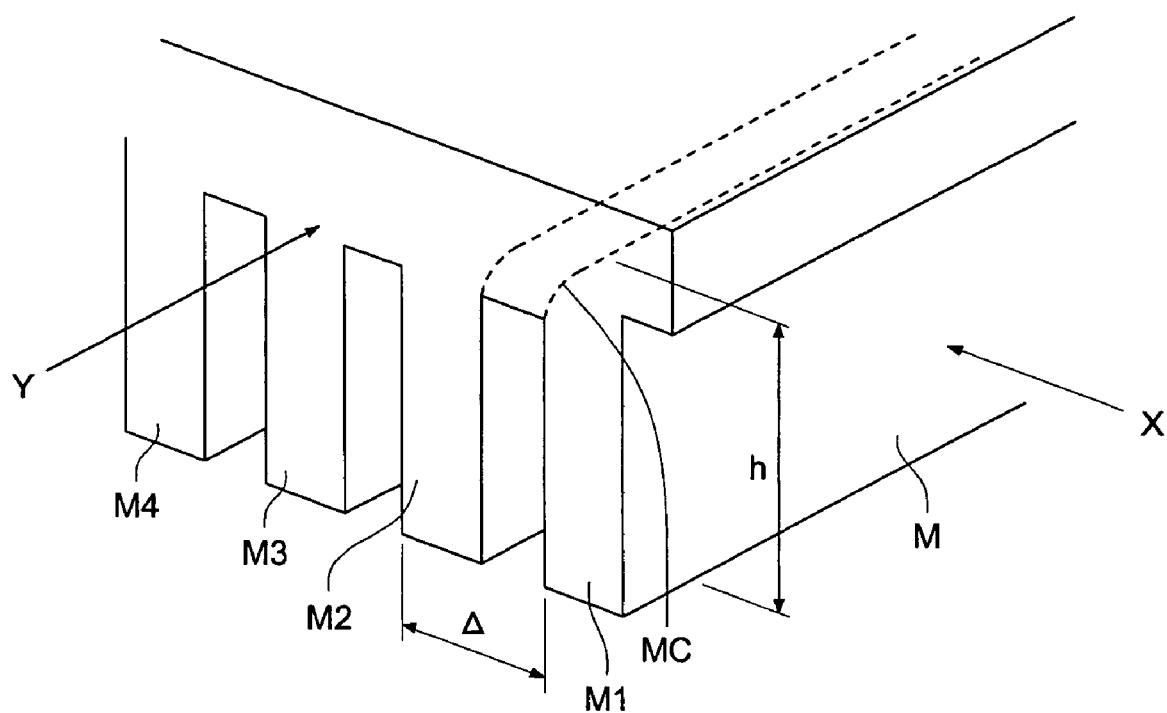
FIG. 3 shows a perspective view of a mold employed in a molding method embodied in the present invention.

Referring to the drawings, an embodiment of the present invention will be detailed in the following. FIG. 2 shows a flowchart of an exemplified molding method embodied in the present invention. FIG. 3 shows a perspective view of a mold employed in the molding method embodied in the present invention. FIGS. 4(a) through 4(d) show schematic diagrams of processes in the molding method embodied in the present invention. FIG. 5 shows a time chart indicating transitions of temperature of the mold, thickness of the Tg layer, strength of the Tg layer and pressure of the press in the time domain.

In FIGS. 4(a) through 4(d), upper mold 2 formed from SUS304 is disposed above lower mold 1, also formed from SUS304 and fixed to a frame (not shown in the drawings), in such a manner that upper mold 2 is movable relative to lower mold 1. A heater 4, which is coupled to power source E through switch SW, is disposed in a hollow space formed inside upper mold 2. Further, piston 6a inserted into oil pressure cylinder 6, serving as a driving section, is coupled to the upper section of upper mold 2. By press-injecting working fluid into oil pressure cylinder 6 from an oil tank (not shown in the drawings), piston 6a is pushed downward and by withdrawing the working fluid into the oil tank, piston 6a is returned to the upper position. A molding member M is attached to the lower surface of upper mold 2. On the other hand, cooling pipe 5 for cooling lower mold 1 is disposed inside lower mold 1. However, instead of equipping cooling pipe 5 in lower mold 1, it is also applicable that a cooling device detailed later (refer to FIG. 10) is mounted onto upper mold 2. The combination of upper mold 2 and molding member M constitutes the mold defined in the claims.

As shown in FIG. 3, protrusions M1, M2, M3, M4, - - - , (also referred to as walls M1, M2, M3, M4, - - - ), being a plurality of microscopic plate structures onto surfaces of which a water-repellent finish is applied, are formed with equal pitch Δ on molding member M. In the embodiment, pitch Δ is set at a value in a range of 400-600 nm, while the height of protrusions M1, M2, M3, M4, - - - is set at a value in a range of 1600-1700 nm. However, the scopes of those values are not limited to the abovementioned ranges. Incidentally, when viewing protrusions M1, M2, M3, M4, - - - in the arranging direction of them (direction of arrow X shown in FIG. 3), groove end portion MC is formed in a shallow arc or a shallow straight shape.

The molding method embodied in the present invention will be detailed as follow. Initially in step S101 shown in FIG. 2, by turning on switch SW, heater 4 disposed at the backside of molding member M is heated to raise the temperature of molding member M (refer to FIG. 4(a)). In this step, cooling water is not yet injected into cooling pipe 5 of lower mold 1. Further, in step S102, when the temperature of molding member M approaches the predetermined temperature, the microscopic structure of molding member M is contacted to molding material P (plastic material) by driving oil pressure cylinder 6 (at time t0 shown in FIG. 16), and then, is lightly pressed onto molding material P (during the time between t0-t1). At time t1, upper mold 2 is made to be standstill by stopping oil pressure cylinder 6 (refer to FIG. 4(b)). Hereinafter, a moving velocity of molding member M, during the period from time t0 when the microscopic structure of molding member M contacts molding material P to time t1, is defined as first velocity v1. Although, in this example, the time period from t1 to t2 is specified as a first pressure application period, it is applicable that molding member M moves at a very low velocity, which is lower than second velocity v2 detailed later (refer to the dotted line). In this case, the average velocity during the period from time t0 to t2 could be specified as the first velocity. Further, it is possible that the first velocity and the first velocity continuously change, instead of changing stepwise, and in such the case, each of the first velocity and the first velocity would be an average velocity.

At this time, on the surface of molding material P, the applied heat creates a melted resin layer, called the Tg layer, in the area at which molding material P and molding member M contacts each other. However, since the whole body of molding material P is not melted, the stiffness of the melted resin layer is maintained so as to prevent it from flowing.

Figure 4A:
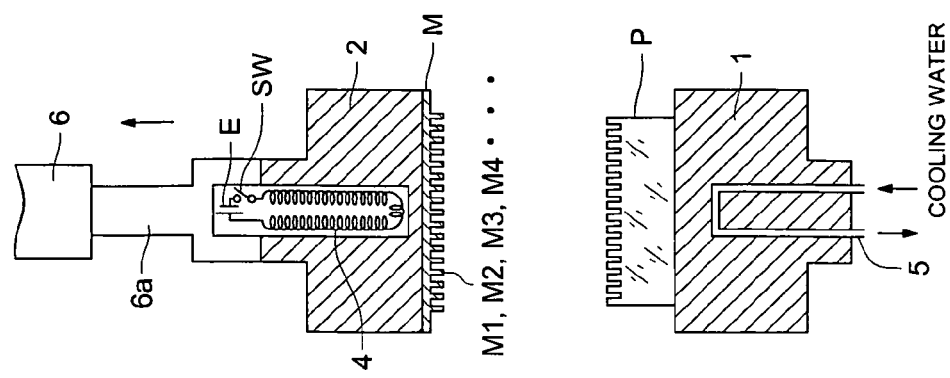
FIG. 4(a), FIG. 4(b), FIG. 4(c) and FIG. 4(d) show cross-sectional schematic diagrams indicating a part of the molding processes embodied in the present invention.
Figure 4B:
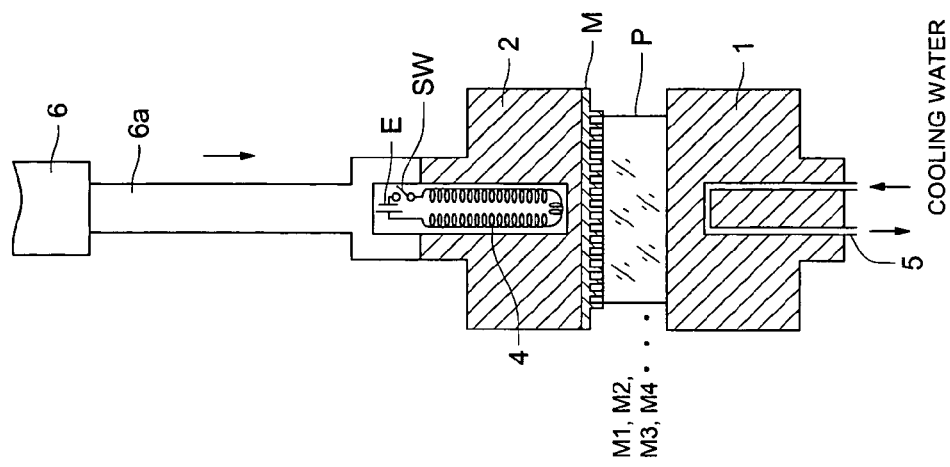
Figure 4C:
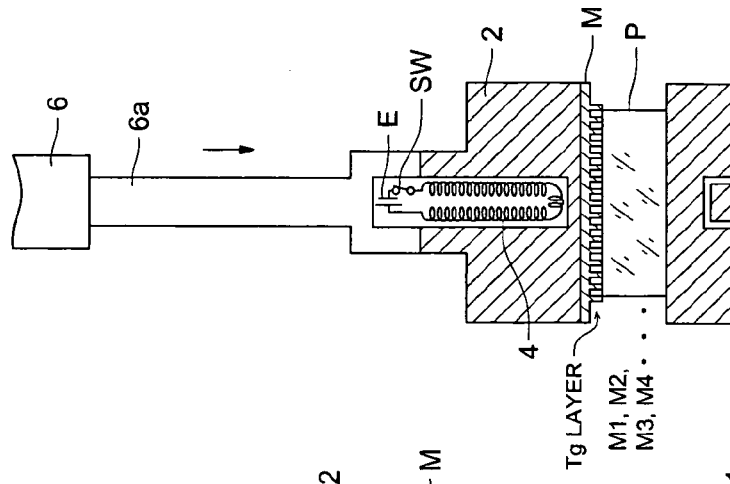
Figure 4D:
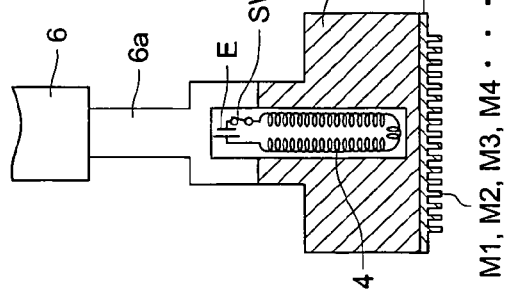
Figure 5:
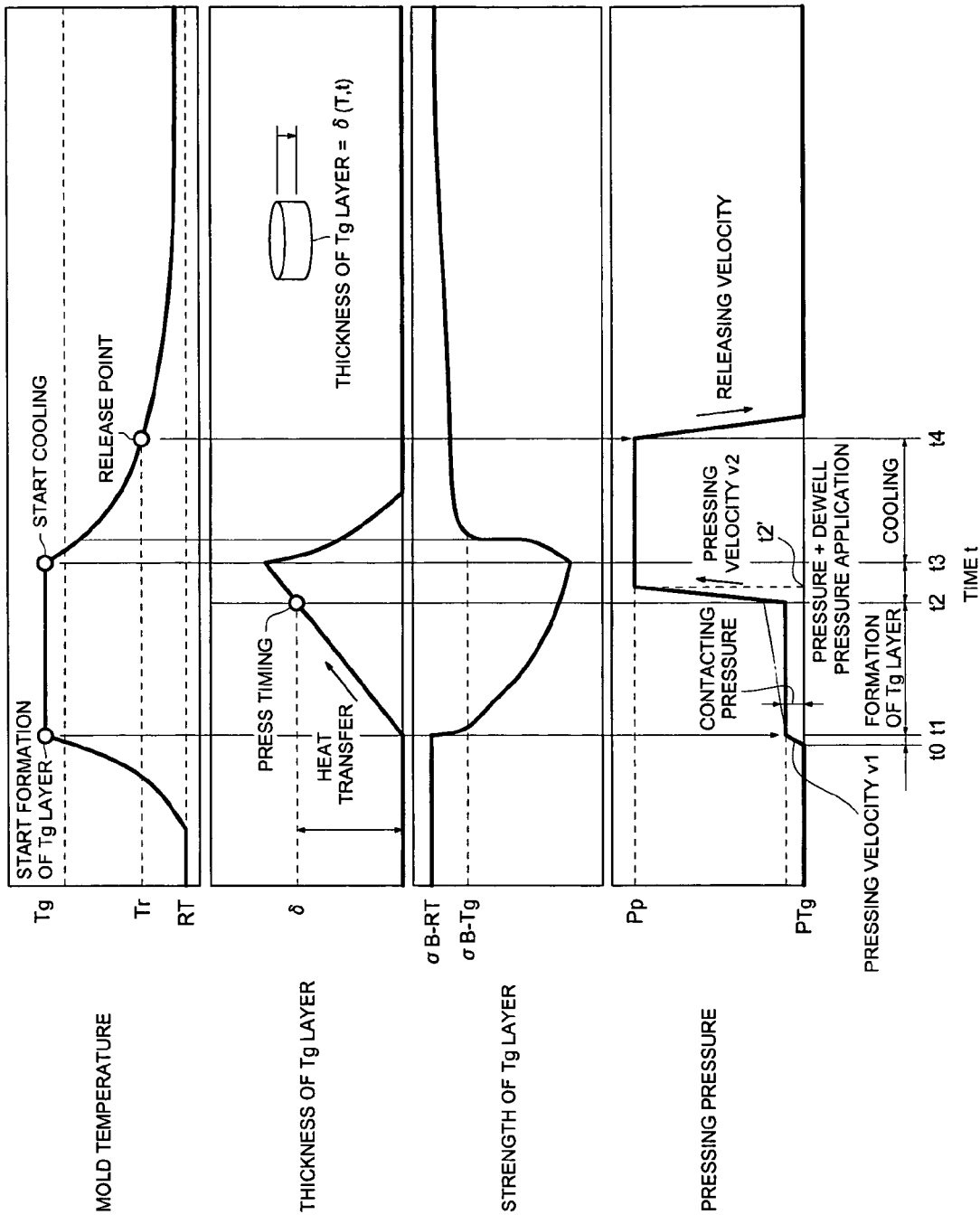
FIG. 5 shows a time chart indicating transitions of temperature of the mold, thickness of the Tg layer, strength of the Tg layer and pressure of the press in the time domain.

Further, when the thickness of the Tg layer reaches to a predetermined thickness (at time t2 shown in FIG. 5) in step S103, oil pressure cylinder 6 is driven so that molding member M is pressed against molding material P by moving the mold at second velocity v2 being faster than first velocity v1, and then, oil pressure cylinder 6 is stopped so as to keep molding member M in that pressing state (refer to FIG. 4(c)). According to this operation, the microscopic structure of molding member M can be accurately transferred onto molding material P. In this case, the time period from time t2', at which molding member M is made to be standstill, to time t4, at which molding member M is made to be returned, is specified as a second pressure application period (the velocity of molding member M is equal to zero). By setting the first and the second pressure application periods, it becomes possible to prevent the melted resin layer, generated by heating molding material P, from flowing.

Then, when the predetermined time period has elapsed (at time t3 shown in FIG. 5) in step S104, the molding member. M is rapidly cooled by injecting cooling water into the gap between molding member M and heater 4, and at the same time, the heating operation of heater 4 is stopped by turning off switch SW. Further, when the temperature of molding member M is lowered to a predetermined temperature (at time t4 shown in FIG. 5) in step S105, oil pressure cylinder 6 is driven to move backward to raise upper mold 2 so that molding member M is released from molding material P by moving molding member M at a predetermined velocity (refer to FIG. 4(d)). Successively, in step S106, the cooling water for cooling molding member M is drained from the gap. As mentioned in the above, one cycle of processes for transferring the microscopic structure of molding member M onto molding material P is conducted.

Figure 6A:
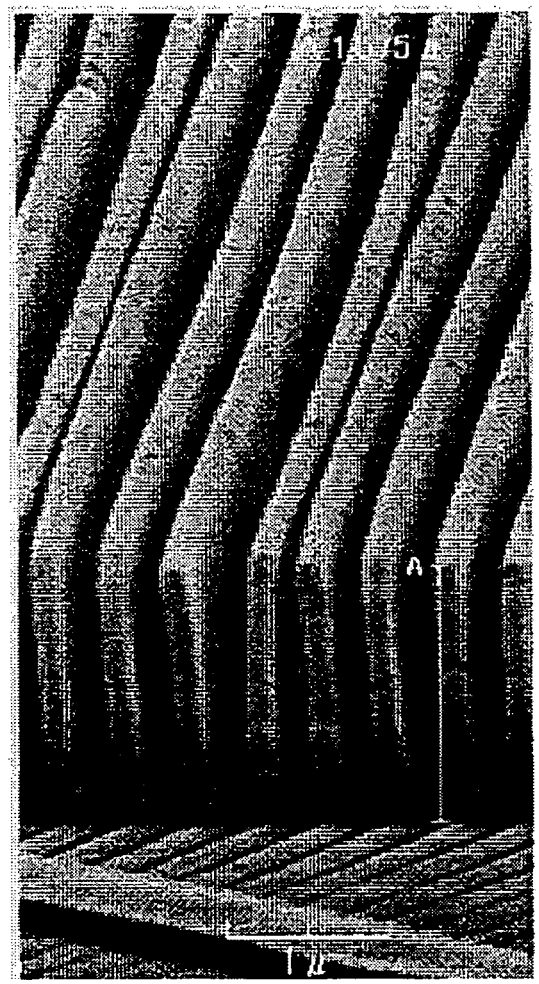
Figure 6B:
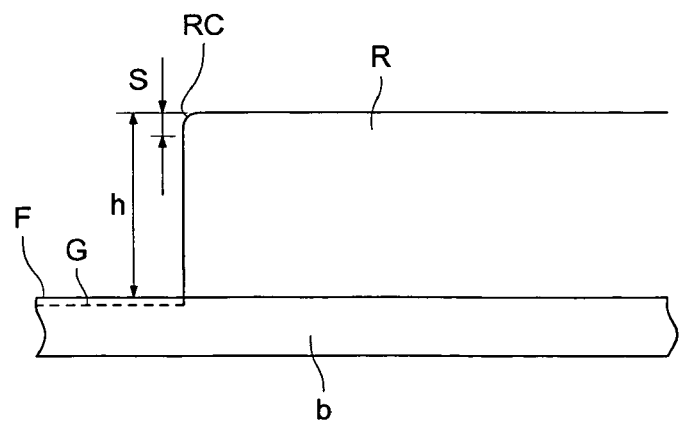
FIG. 6(b) shows a schematic diagram of molding material P, when viewing it from an arranging direction of plate structures R.

FIG. 6(a) shows a microphotograph of molding material P molded through the abovementioned processes. FIG. 6(b) shows a schematic diagram of molding material P, when viewing it from an arranging direction of plate structures R. The molding material P is a raw material of the ¼ wavelength plate. The pitch of plate structures R, which constitute the uneven structure formed on plate-shaped base B, is set at 400 nm, while its height is set at 1600 nm. Accordingly, the aspect ration of plate structure R is four. Incidentally, in molding material P according to the present invention, shallow grooves G, each of which corresponds to each of gaps between adjacent plate structures R, are formed on plane F extended from plate structures R. The shallow grooves G are not formed by transferring molding member M, but inherently emerge only when conducting the molding method embodied in the present invention. This shallow grooves G have such an effect that shallow grooves G promote the releasability of molding member M by accelerating the introducing action of the air when releasing molding member M from molding material P. Further, since edge portion RC, located at a position being apart from base B of plate structure R and formed by transferring groove end portion MC shown in FIG. 3, is formed by cutting it in a shallow arc or a shallow straight shape when viewing it from the direction shown by FIG. 6(b), the flow of the melted resin can be improved and the stiffness of plate structure R is desirably increased. It is preferable that position "s" of the portion, to be cut in the shallow arc or the shallow straight shape, is equal to or lower than 95% of height "h" of plate structure R (s/h>0.05).

Figure 15:
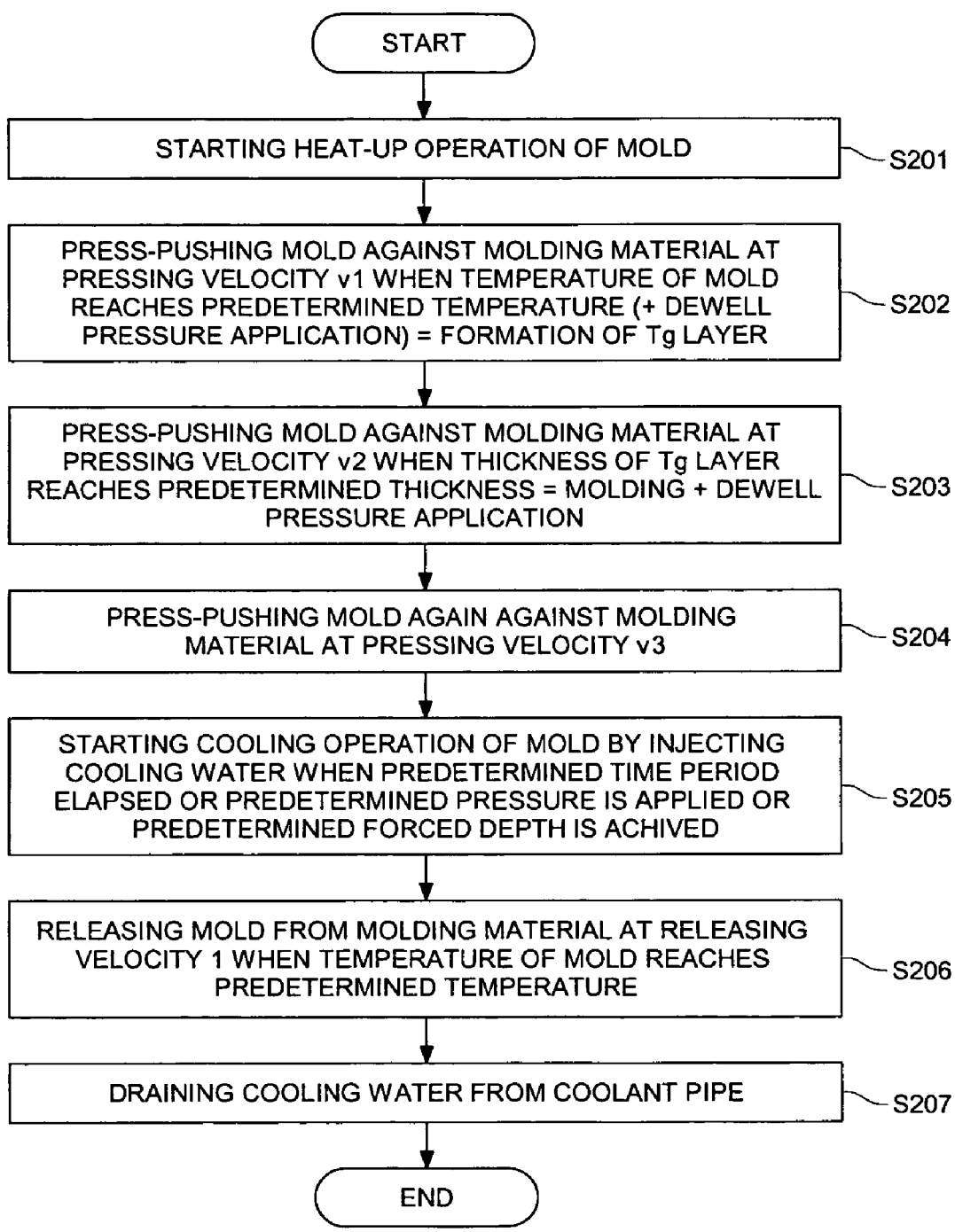
FIG. 15 shows a flowchart, which indicates a modified example of the molding method embodied in the present invention.
Figure 16:
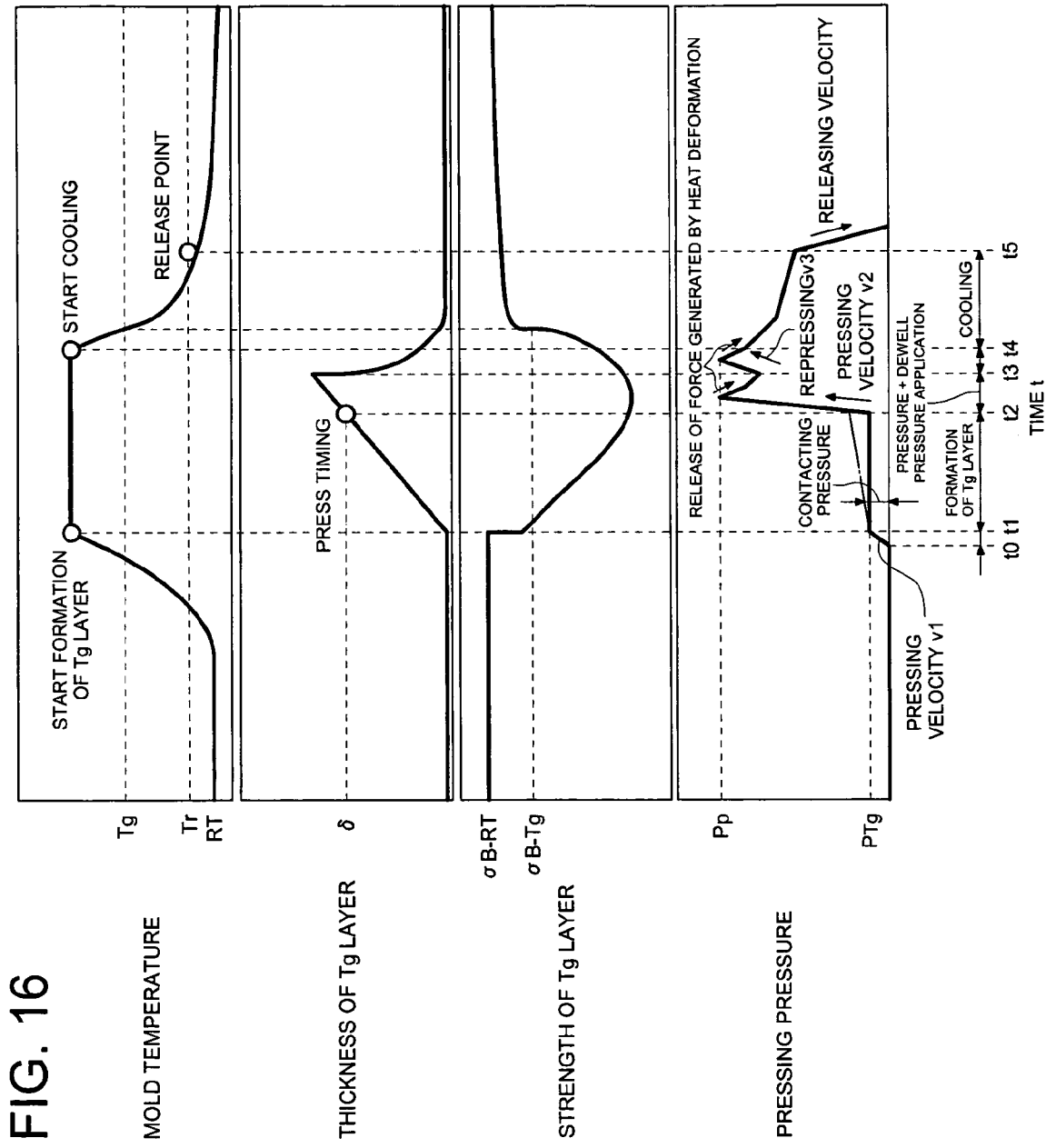
FIG. 16 shows a time chart indicating transitions of temperature of the mold, thickness of the Tg layer, strength of the Tg layer and pressure of the press, employed for a modified example, in the time domain.

FIG. 15 shows a flowchart, which indicates a modified example of the abovementioned molding method embodied in the present invention. FIG. 16 shows a time chart indicating transitions of temperature of the mold, thickness of the Tg layer, strength of the Tg layer and pressure of the press in the time domain. This modified example is suitable for such the case that a resin, which is relatively deformable with heat, is employed as the molding material.

Further, referring to FIG. 4, a molding method embodied in the present invention will be detailed in the following. Initially in step S201 shown in FIG. 15, by turning on switch SW, heater 4 disposed at the backside of molding member M is heated to raise the temperature of molding member M (refer to FIG. 4(a)). In this step, cooling water is not yet injected into cooling pipe 5 of lower mold 1. Further, in step S202, when the temperature of molding member M approaches the predetermined temperature, the microscopic structure of molding member M is contacted to molding material P (plastic material) by driving oil pressure cylinder 6 (at time t0 shown in FIG. 16), and then, is lightly pressed onto molding material P (during the time between t0-t1). At time t1, upper mold 2 is made to be standstill by stopping oil pressure cylinder 6 (refer to FIG. 4(b)). Hereinafter, a moving velocity of molding member M, during the period from time t0 when the microscopic structure of molding member M contacts molding material P to time t1, is defined as first velocity v1. Although, in this example, the time period from t1 to t2 is specified as a first pressure application period, it is applicable that molding member M moves at a very low velocity, which is lower than second velocity v2 detailed later (refer to the dotted line). In this case, the average velocity during the period from time t0 to t2 could be specified as the first velocity. Further, it is possible that the first velocity and the first velocity continuously change, instead of changing stepwise, and in such the case, each of the first velocity and the first velocity would be an average velocity.

At this time, on the surface of molding material P, the applied heat creates a melted resin layer, called the Tg layer, in the area at which molding material P and molding member M contacts each other.

Further, when the thickness of the Tg layer reaches to a predetermined thickness (at time t2 shown in FIG. 16) in step S203, oil pressure cylinder 6 is driven so that molding member M is pressed against molding material P by moving the mold at second velocity v2 being faster than first velocity v1, and then, oil pressure cylinder 6 is stopped so as to keep molding member M in that pressing state (refer to FIG. 4(c)).

In the abovementioned process, there is a fear that, depending on molding material P, since the pressure exerted between molding member M and molding material P decreases due to a stiffness reduction caused by an occurrence of heat deformation, molding material P cannot be sufficiently filled into the gaps between the microscopic patterns formed on molding member M, resulting in a short shot, so to speak. To overcome such the shortcoming, in the modified example, at a predetermined time after molding member M stops in step S204, molding member M is pushed again (repressed) against molding material P at a third velocity by driving oil pressure cylinder 6 (at time t3 shown in FIG. 16). Accordingly, it becomes possible to accurately transfer the microscopic shape of molding member M onto molding material P, even if molding material P is easily deformed with heat. Although it is preferable that third velocity v3 is equal to or approximately equal to second velocity v2, the scope of third velocity v3 is not limited to such the value.

Then, when the predetermined time period has elapsed (at time t4 shown in FIG. 16) in step S204, the mold M is rapidly cooled by injecting cooling water into the gap between mold M and heater 4, and at the same time, the heating operation of heater 4 is stopped by turning off switch SW. Further, when the temperature of molding member M is lowered to a predetermined temperature (at time t5 shown in FIG. 16) in step S206, oil pressure cylinder 6 is driven to move backward to raise upper mold 2 so that molding member M is released from molding material P by moving molding member M at a predetermined velocity (refer to FIG. 4(d)). Successively, in step S207, the cooling water for cooling molding member M is drained from the gap. As mentioned in the above, one cycle of processes for transferring the microscopic structure of molding member M onto molding material P is conducted.

Figure 7:
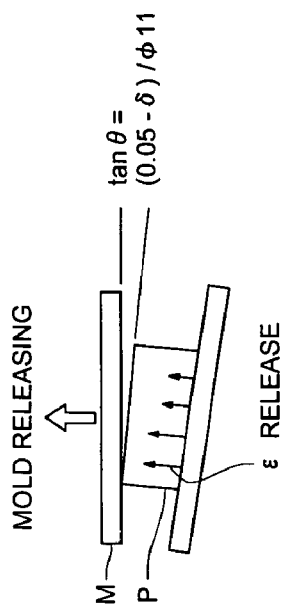
FIG. 7(a), FIG. 7(b) and FIG. 7(c) show schematic diagrams of another molding processes embodied in the present invention.
Figure 7:
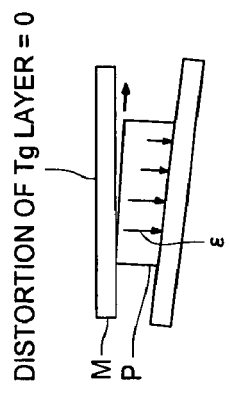
Figure 7:
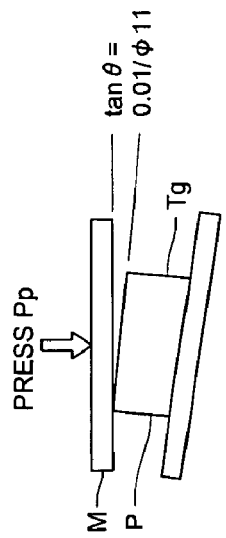
Figures 8, 9:
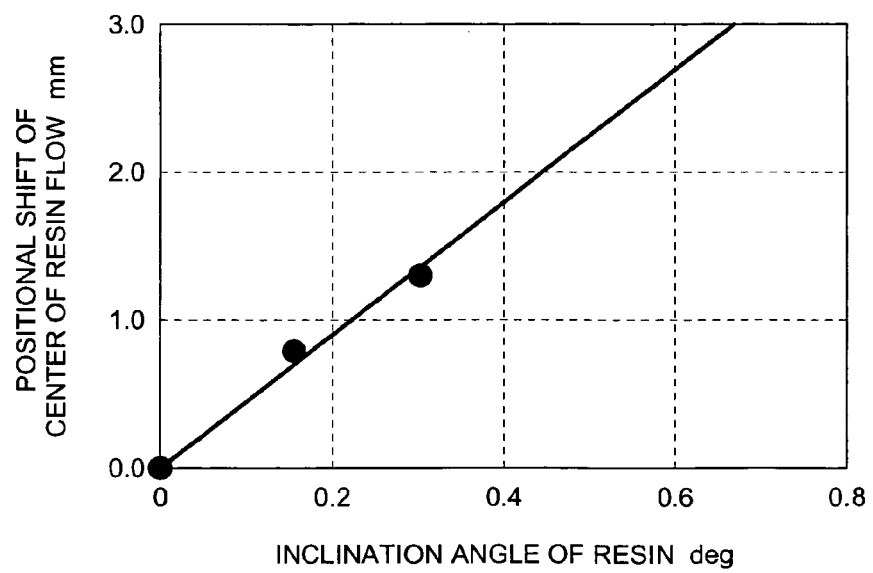
FIG. 8 shows examples of flow of melted resin.
FIG. 9 shows a graph of a relationship between an inclination and a deviation of the central position.

By the way, there has been a problem that the flowing direction of the melted material of molding material P is inconstant, when the whole body of molding material P is heated by molding member M heated with the heater. FIGS. 7(a) through 7(c) show schematic diagrams of processes of another molding method embodied in the present invention to cope with the abovementioned problem. FIG. 8 shows examples of flow of the melted resin. In FIG. 8, directions of the arrow indicate flowing directions of the melted resin, and lengths of the arrow indicate intensities of flow of the melted resin.

As shown in section (a) of FIG. 8, when the heating-press operation is applied to molding material P without inclining the molding material P, the flowing direction of the melted resin is inconstant. Accordingly, in the embodiment of the present invention, molding material P is positioned against molding member M in a state of inclining molding material P with respect to molding member M, so that molding material P gradually contacts molding member M from a part of the microscopic structure of molding member M (refer to FIG. 7(a)). Press-pushing molding member M against molding material P while maintaining the angle of inclination, the distortion, generated in the inside of molding material P, successively increases from the press-pushed side of molding material P, and therefore, the flowing directions of the melted resin are unified in one direction (refer to FIG. 7(b)). Accordingly, by making direction Y, orthogonal to arranging direction X of the plate structures of molding member M shown in FIG. 3, coincide with the flowing direction of the melted resin, it becomes possible to increase the filling efficiency of molding material P into the plate structures of molding member M. When all of the microscopic structure of molding member M is dipped with the melted resin, molding member M is made to be parallel to molding material P (namely, the angle of inclination becomes zero). Incidentally, by releasing molding member M from molding material P while maintaining the inclined relationship between them at the time of mold releasing process, the distortion generated in the inside of molding material P is relieved successively from the initially released side of molding material P, resulting in a security of good releasability (refer to FIG. 7(c)).

Now, there arises a problem how many degrees should be set for the angle of inclination of molding material P versus molding member M. If the center of molding material P flowed and largely shifted from its original position before melting, due to the heat-melting action of molding material P, the flowing amount of the melted resin would become large corresponding to the shift amount of the center. Accordingly, there is a fear that such the flow of the melted resin adversely influences the characteristics of the produced optical element. The present inventors conducted experiments for a case that molding material P is inclined to molding member M at 0.15 degree (refer to section (b) of FIG. 8) and a case that molding material P is inclined to molding member M at 0.3 degree (refer to section (c) of FIG. 8) and derived a graph shown in FIG. 9 from the experiments.

According to the graph shown in FIG. 9, it is found that the inclination of 0.15 degree generates the center positional deviation of 0.5 mm, while the inclination of 0.3 degree generated the center positional deviation of 1.0 mm. For instance, as for the optical element to be employed for the optical pickup device, a generation of the center positional deviation, being equal to or greater than 2 mm, would not be acceptable. Accordingly, it is preferable that the inclination between molding member M and molding material P is equal to or smaller than 0.5 degree at maximum.

Figure 10:
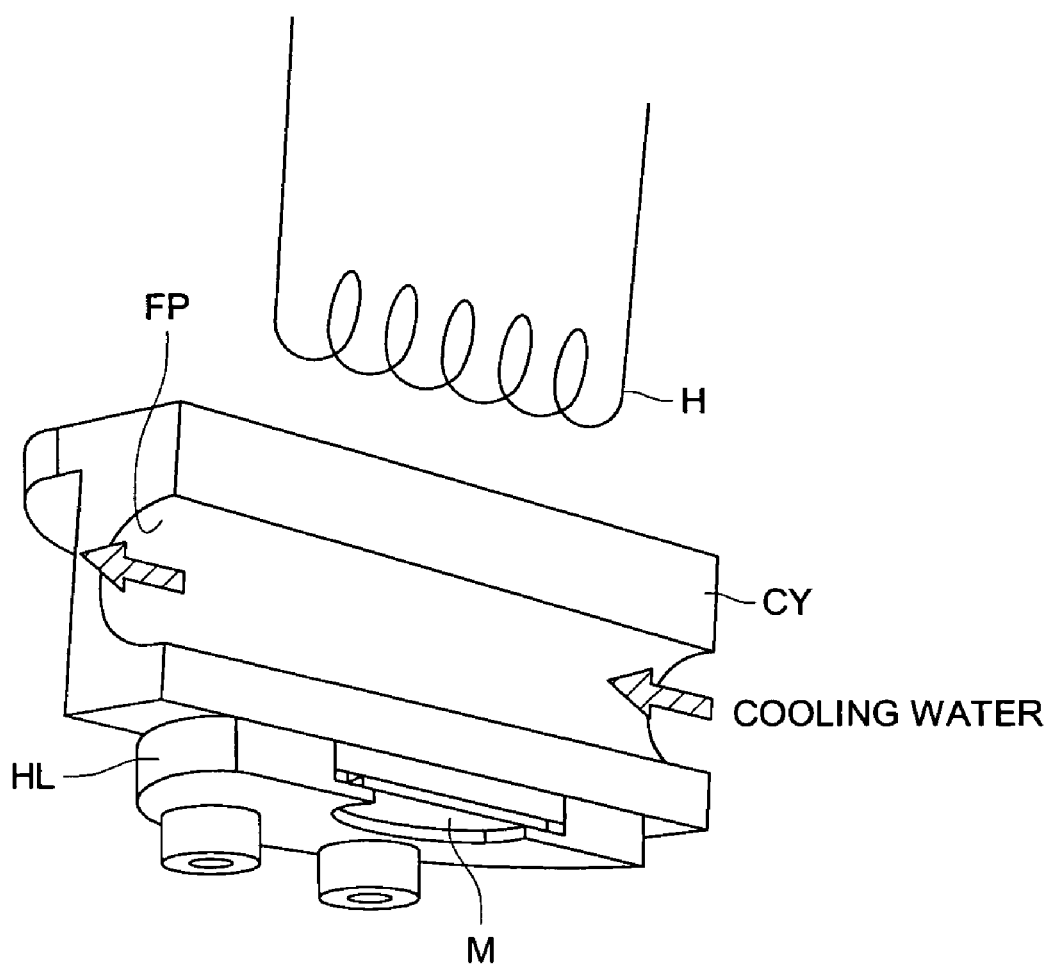
FIG. 10 shows a cross-sectional perspective view of a cut model of the cooling device to be employed for the manufacturing method embodied in the present invention.

FIG. 10 shows a perspective view of a cut model of the cooling device to be employed for the manufacturing method embodied in the present invention. As shown in FIG. 10, molding member M is attached to the lower surface of cylindrical body CY by using holder HL. Further, heater 4, serving as a heating source, is disposed above the upper surface of cylindrical body CY. A fluid path FP through which the cooling water passes is formed in cylindrical body CY, and is connected to the tap water pipe through a bulb (not shown in the drawings). When heater 4 heats molding member M, the bulb is closed so as not to introduce the cooling water into fluid path FP (until time t3 shown in FIG. 5). On the other hand, at the time of cooling operation (at time t3 shown in FIG. 5), the bulb is opened so as to introduce the cooling water into fluid path FP, and then, the temperature of molding member M is drastically reduced at a time.

Figure 11:
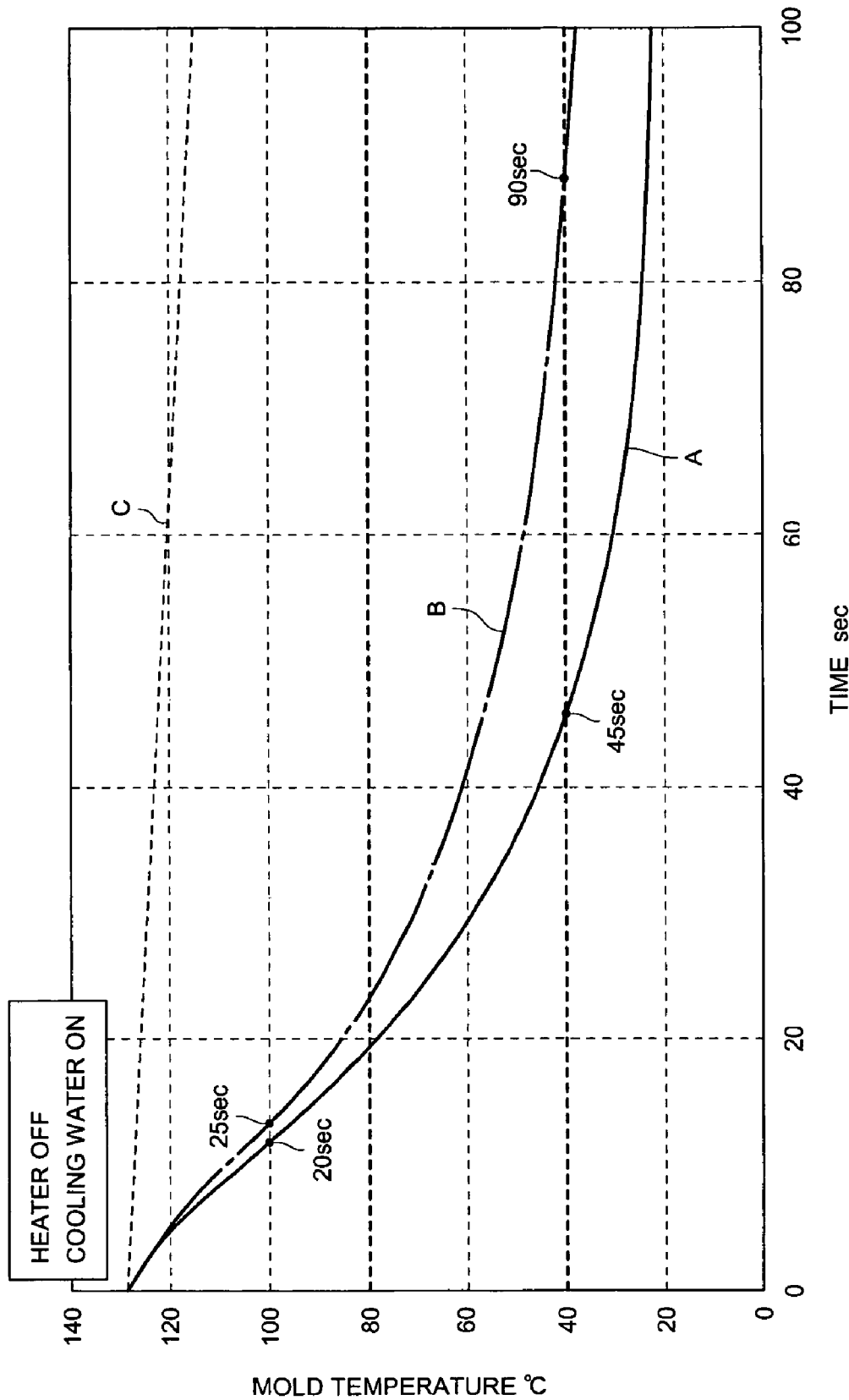
FIG. 11 shows a graph, which indicates an efficiency of the cooling device embodied in the present invention.

FIG. 11 shows a graph, which indicates the efficiency of the cooling device embodied in the present invention. When comparing the plot A corresponding to the large quantity of cooling water flow, the plot B corresponding to the small quantity of cooling water flow and the plot C corresponding to no quantity of cooling water flow in a natural cooling state, with each other, it can be found that the temperature of molding member M decreases to half of the initial temperature when introducing the cooling water into fluid path FP. Accordingly, the molding cycle of molding member M is increased, and the mass production of the optical elements, having a microscopic structure, becomes possible.

Incidentally, the optical pickup device, which can compatibly conduct recording/reproducing operations for DVD and CD, generally employs the semiconductor laser diodes having the different wavelengths of both 665 nm and 780 nm. On the other hand, since the blue-violet semiconductor laser diode, developed in recent years, can emit a laser beam having a wavelength of 405 nm, the optical pickup device, which employs such the blue-violet semiconductor laser diode, can conduct recording/reproducing operations for BD, HD and DVD with higher recording-density than ever. Accordingly, there has been also developed an optical pickup device, which can compatibly conduct recording/reproducing operations for not only DVD and CD, but also such the high recording-density optical discs.

To make an optical system, for converging a laser spot onto the image recording surface of the optical disc, compatible among various kinds of optical discs, sometimes, a wave plate, which gives a phase difference to the laser beam passing through it, would be employed. Such the wave plate can be formed by employing the structural birefringence property, instead of using the artificial-quartz plate, which is generally expensive. The structural birefringence property is defined as a birefringence phenomenon caused by a directivity of the microscopic structure. For instance, it is well known that the microscopic structure, in which plates, having no birefringence property and different refractivity, are aligned in parallel at intervals sufficiently smaller than the wavelength of the light ($<\lambda/2$), exhibits a birefringence property.

Nevertheless, since the birefringence property of the crystal or the calcite is inherent to the material concerned, it is virtually impossible to change the birefringence property of it. On the other hand, it is possible to control the birefringence property of the microscopic structure to some extent by changing its material or its shape.

Figure 12:
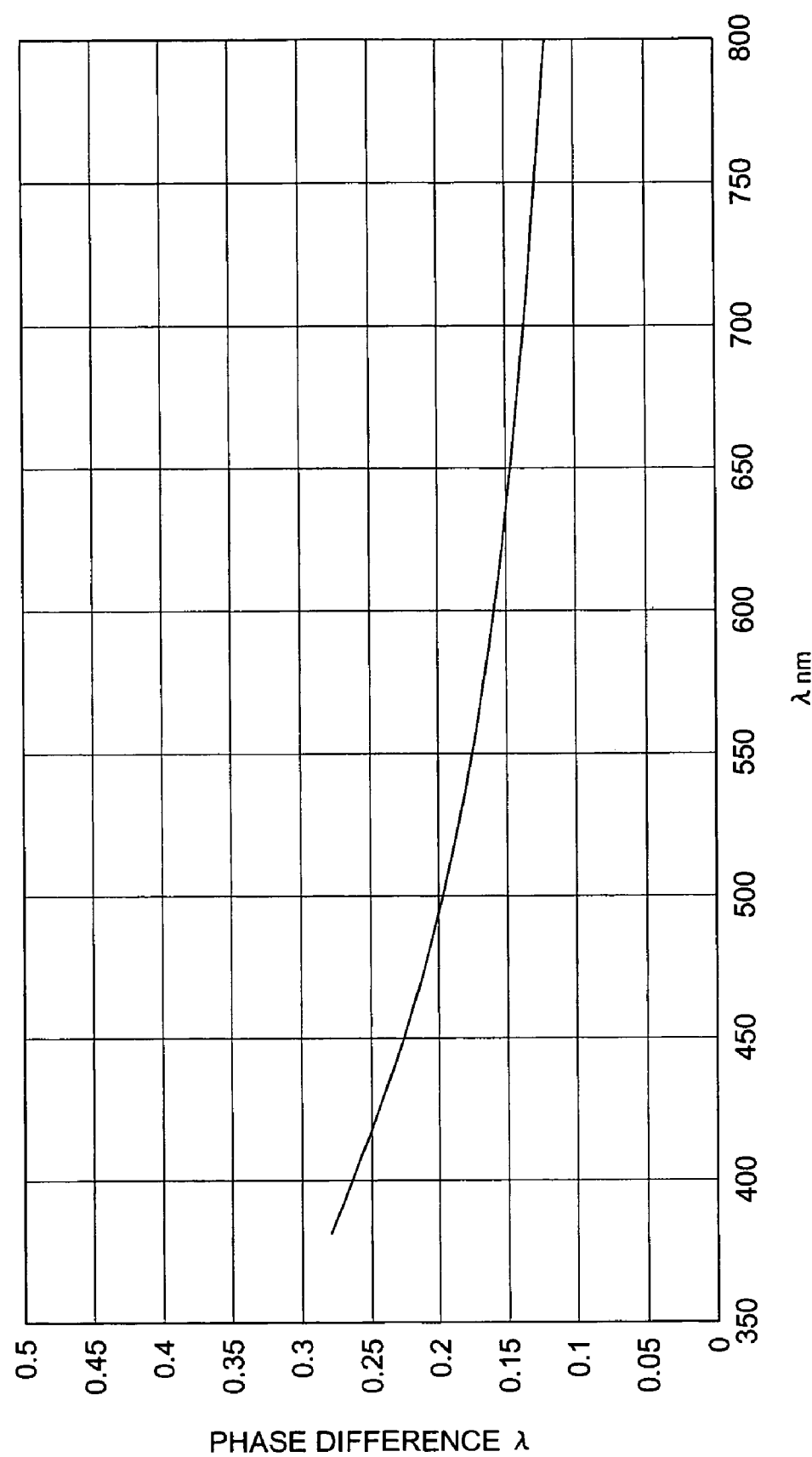
FIG. 12 shows a graph, which indicates a characteristic of a wave plate using the structural birefringence property in a comparison example (horizontal axis: wavelength of passing laser beam, vertical axis: phase difference to be given)

Incidentally, as for the optical pickup device that compatibly conducts recording/reproducing operations for BD or HD DVD and DVD, it is desirable in the abovementioned example to employ the wave plate, which gives a phase difference of, for instance, $\lambda/4$ for the two wavelengths of 405 nm and 665 nm. On the other hand, as for the optical pickup device that compatibly conducts recording/reproducing operations for BD or HD DVD, DVD and CD, it is desirable in the abovementioned example to employ the wave plate, which gives a phase difference of, for instance, $\lambda/4$ ($=0.25\lambda$) for the three wavelengths of 405 nm, 665 nm and 780 nm. However, according to the conventional wave plate provided with the microscopic structure for exhibiting the birefringence property, for instance, when the microscopic structure is designed so as to give the phase difference of $0.25\lambda$ to the laser beam having a wavelength of 405 nm, such the microscopic structure will give the phase difference of $0.15\lambda$ to the laser beam having a wavelength of 655 nm and the phase difference of $0.13\lambda$ to the laser beam having a wavelength of 780 nm. Therefore, it has been a problem that such the conventional wave plate cannot exhibit a sufficient function as the ¼ wave palate (refer to FIG. 12).

Figure 13:
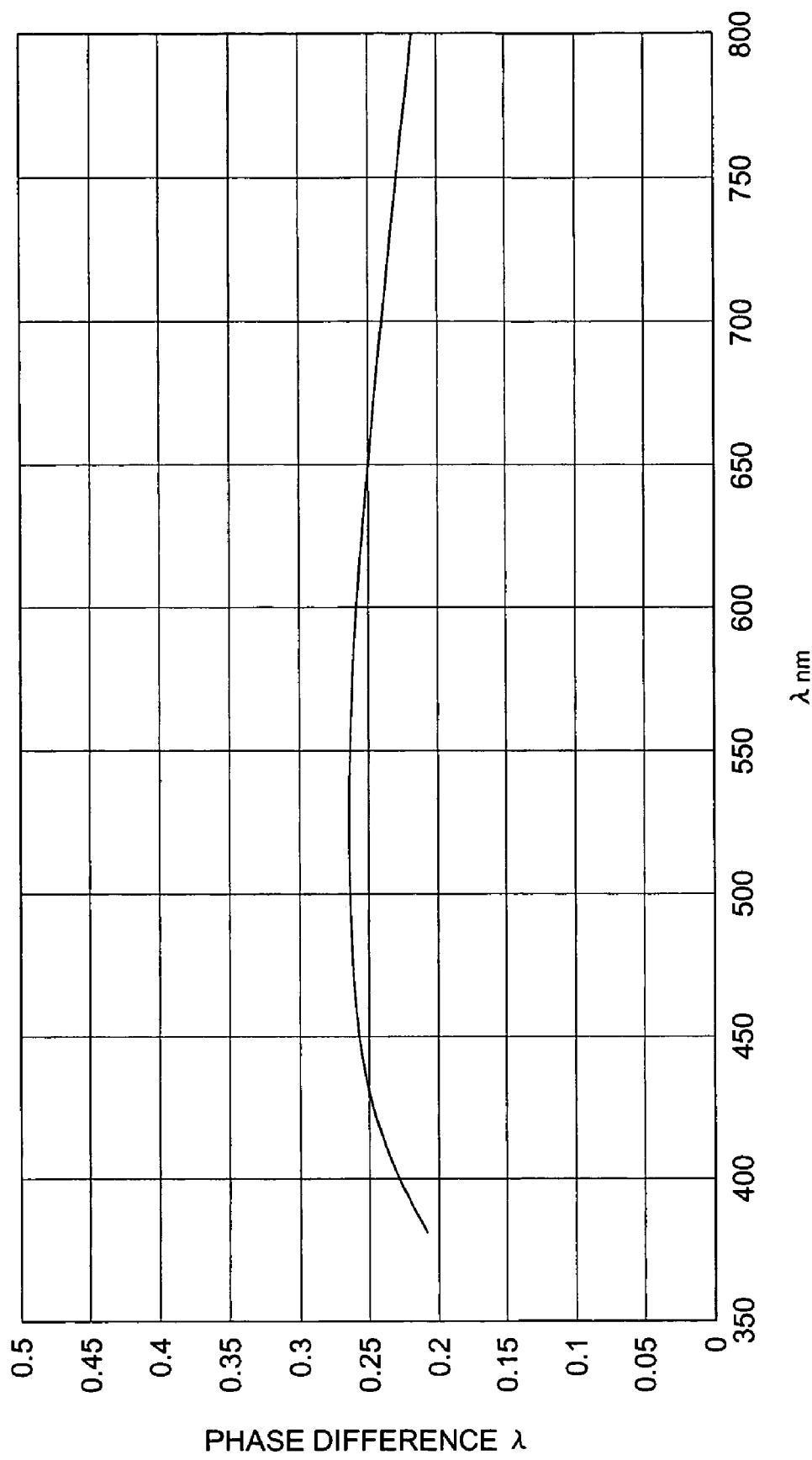
FIG. 13 shows a graph, which indicates a characteristic of a wave plate using the structural birefringence property in an embodiment (horizontal axis: wavelength of passing laser beam, vertical axis: phase difference to be given)

To cope with the abovementioned problem, as a result of the intensive studies, the present inventors have developed the wave plate, which can give substantially a constant phase difference, irrespective of various wavelengths. Concretely speaking, by setting the aspect ratio of the microscopic structure at a higher value than that of the conventional one, and further, by using the wavelength dependency of material refractivity (a property of refractivity change associated with change of the wavelength), the present inventors have realized such the property to give substantially a constant phase difference, irrespective of various wavelengths (refer to FIG. 13).

Figure 14:
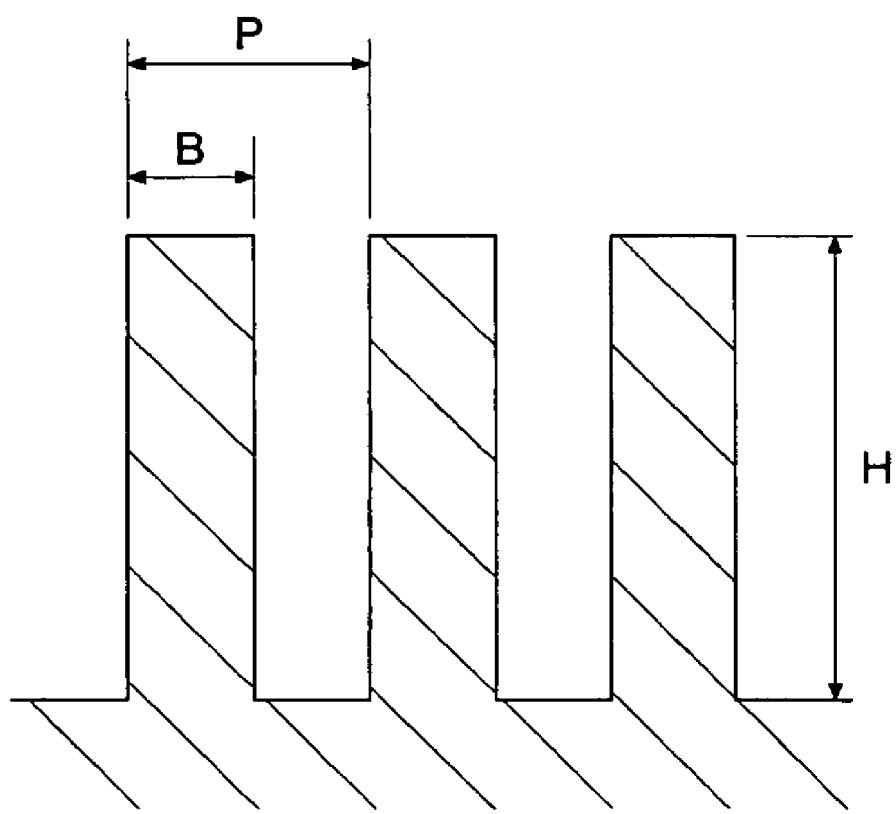
FIG. 14 shows a cross sectional schematic diagram of a microscopic structure formed on a wave plate embodied in the present invention.

FIG. 14 shows a cross sectional schematic diagram of the microscopic structure formed on the wave plate embodied in the present invention. In FIG. 14, a pitch of microscopic protrusions arrayed periodically is in a range of 300-400 nm, width B of the microscopic protrusions is in a range of 0.6×P-0.9×P and height H of the microscopic protrusions is in a range of 500-3000 nm. By employing optimum values selected from the abovementioned ranges corresponding to the property of the material concerned, it is possible to acquire the property for giving substantially the constant phase difference, irrespective of various wavelengths. For instance, the characteristic curve shown in FIG. 13 can be obtained when the microscopic structure having dimensions of P=400 nm, B=275 nm and H=2400 nm is formed on the PMMA material.

Although various embodiments of the present invention are described in the foregoing, the scope of the present invention is not limited to the aforementioned embodiments. It is needless to say that disclosed embodiment can be varied by a skilled person without departing from the spirit and scope of the invention. The present invention can be applied not only for the optical elements to be employed for optical pickup device, but also for various kinds of other optical elements or for a molding operation of an ink-jet printer head.

What is claimed is:

1. A molding method for making an element with a microscopic structure, comprising the steps of:

setting a temperature of a mold, having a microscopic shape, at a value higher than a glass transition temperature of a material being deformable with heat;

pushing said mold against said material at a first velocity, after said material is positioned opposite to said mold so that said microscopic shape contacts said material;

establishing a first pressure application period, during which a moving velocity of said mold is maintained at zero;

pushing said mold against said material at a second velocity being faster than said first velocity; and releasing said mold from said material wherein the larger an aspect ratio of said microscopic shape is, the slower said first velocity is to facilitate the accurate transfer of microscopic shapes having a large aspect ratio.

2. The molding method of claim 1, further comprising the step of:

cooling said mold, after said step, of pushing said mold against said material at said second velocity, is completed.

3. The molding method of claim 1, further comprising the step of:

pushing again said mold, after said step, of pushing said mold against said material at said second velocity, is completed.

4. The molding method of claim 1, wherein a pushing pressure for pushing said mold against said material at said first velocity is equal to or smaller than a half of that for pushing said mold against said material at said second velocity.

5. The molding method of claim 1, wherein a second pressure application period, which is defined as a predetermined period for maintaining the moving velocity of said mold at zero, is established within a term from a time when said mold contacts said material to a time when said mold is released from said material.

6. The molding method of claim 1, wherein a water-repellent finish is applied onto a surface of said mold.

7. The molding method of claim 1, wherein microscopic protrusions arrayed in a predetermined direction are formed on said material by transferring said microscopic shape of said mold through said steps; and wherein a pitch of said microscopic protrusions is in a range of 300-400 nm, and a width of said microscopic protrusions is in a range of $0.6 \times P$-$0.9 \times P$ nm, where P represents a value of said pitch, and a height of said microscopic protrusions is in a range of 500-3000 nm.

* * * * *